United States Patent [19]

Vanderlaan

[11] Patent Number: 4,816,707
[45] Date of Patent: Mar. 28, 1989

[54] LIMITED ANGLE TORQUE MOTOR WITH WIDE ROTATION POLES

[75] Inventor: Robert D. Vanderlaan, Kalamazoo, Mich.

[73] Assignee: Pneumo Corporation, Boston, Mass.

[21] Appl. No.: 761,772

[22] Filed: Aug. 2, 1985

[51] Int. Cl.$^4$ .................... H02K 21/14; H02K 33/00
[52] U.S. Cl. ........................ 310/36; 310/116; 310/254; 335/272
[58] Field of Search .................. 310/36–38, 310/152, 154, 156, 116; 335/272

[56] References Cited

U.S. PATENT DOCUMENTS

| 3,663,851 | 5/1972 | Persson | 310/154 |
| 4,510,403 | 4/1985 | Vanderlaan et al. | 310/36 |

Primary Examiner—Patrick R. Salce
Assistant Examiner—D. L. Rebsch
Attorney, Agent, or Firm—Renner, Otto, Boisselle & Sklar

[57] ABSTRACT

Limited angle torque motor includes a rotor assembly having one or more permanent magnets which are magnetized in the diametrical direction and a stator assembly including a pair of circumferentially spaced stator magnetic pole pieces, each having a stator pole flange at the opposite end thereof. Each stator pole piece has a greater circumferential width in the region of the respective stator pole flanges to increase the amount of magnetic material in such region where the flux density is the highest. Surrounding the stator assembly is a magnetic housing which desirably effectively has no air gap therein.

17 Claims, 5 Drawing Sheets

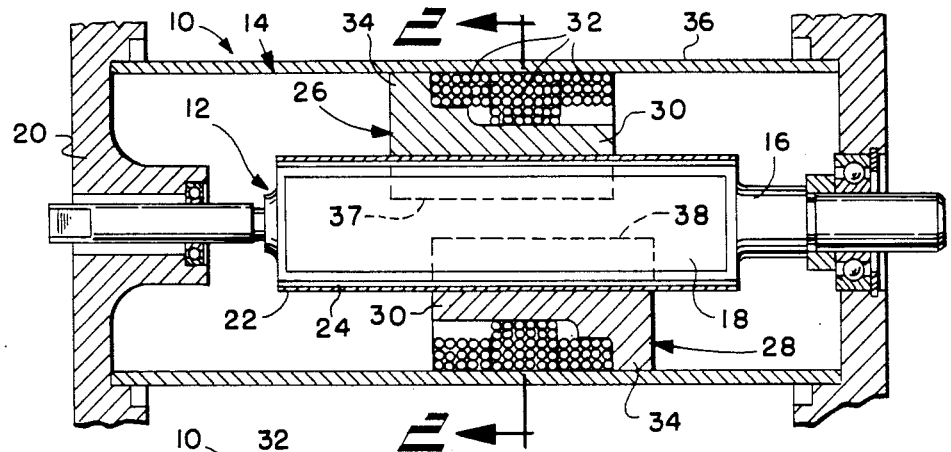
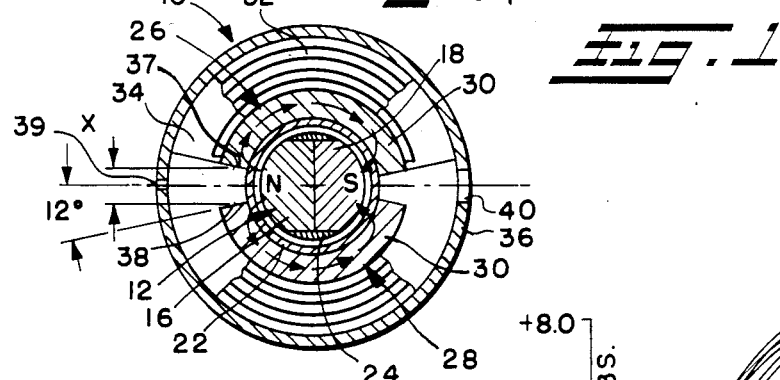
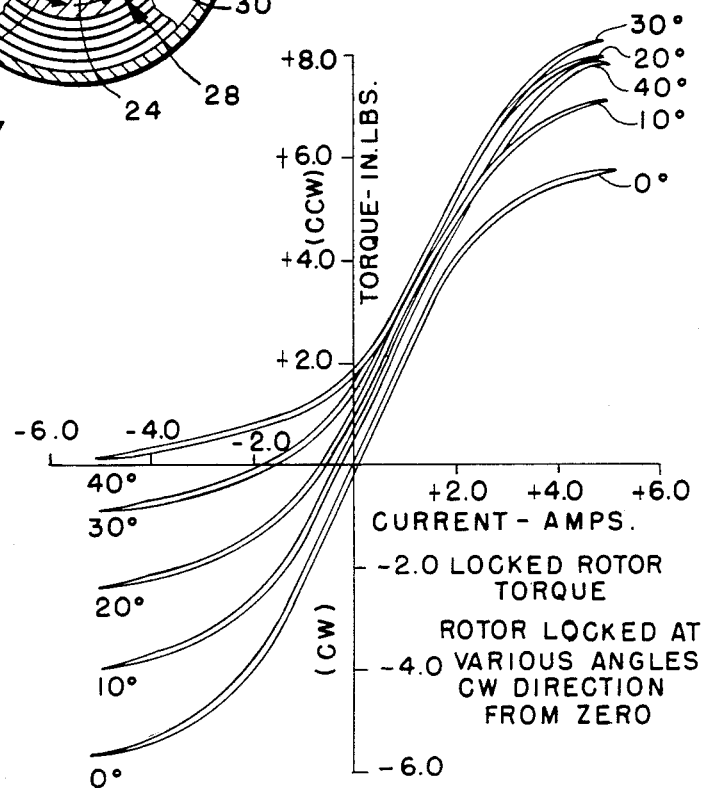

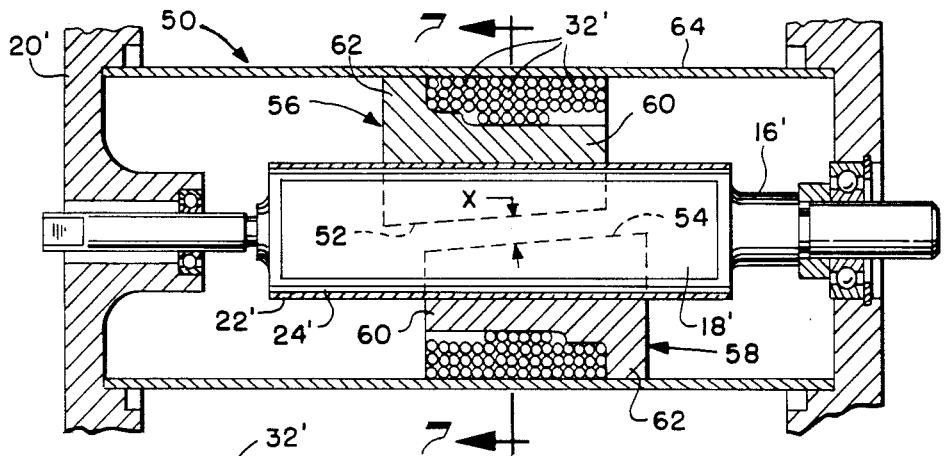
_FIG. 6_
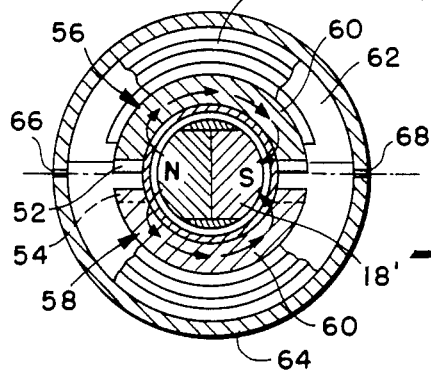
_FIG. 7_
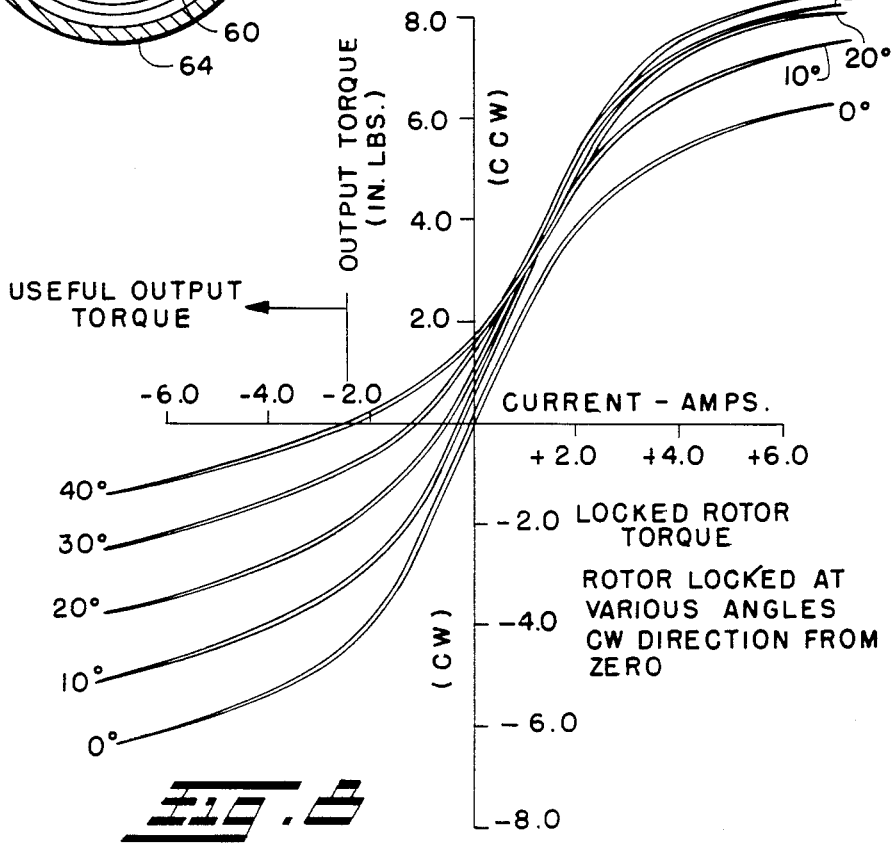
_FIG. 8_

LIMITED ANGLE TORQUE MOTOR WITH WIDE ROTATION POLES

BACKGROUND OF THE INVENTION

This invention relates generally as indicated to a limited angle torque motor with wide rotation poles. More particularly, this invention relates to certain improvements in limited angle torque motors of the type shown in U.S. Pat. No. 4,510,403, assigned to the same assignee as the present application. Such motors are especially suited for use in certain types of high pressure fluid proportional servo control systems including, but not limited to, aircraft controls for driving proportional control valves of relatively short stroke. The fluid pressure may, for example, be on the order of 1,000 psi or more.

Heretofore, one of the limitations of previous limited angle torque motors of this type has been the inability of the motors to achieve a relatively large working angle, in the range of ±40° of rotation of the motor output shaft, without compromising the reluctance torque spring rate of the motor through null.

In such a motor, it would also be desirable to increase such useful working angle without increase in current. Furthermore, it would be desirable to achieve a more linear rotation angle versus current for more uniform control of valve flow when installed on a hydraulic flow control valve.

SUMMARY OF THE INVENTION

With the foregoing in mind, it is a principal object of this invention to increase the useful working angle of a limited angle torque motor without increasing current.

Another object is to increase the useful working angle of a limited angle torque motor without compromising the reluctance torque spring rate of the motor through null.

Still another object is to achieve a more linear rotation angle versus current over a relatively large useful working angle of the motor for more uniform control of the valve flow when used to operate a hydraulic flow control valve.

These and other objects of the present invention are achieved by shaping the motor stator pole pieces to provide a greater circumferential width in the region of the respective stator pole flanges to increase the amount of magnetic material in such region where the flux density is the highest. This substantially increases the usable motor angle and allows a greater amount of useful work to be performed by the motor.

To the accomplishment of the foregoing and related ends, the invention, then, comprises the features hereinafter fully described and particularly pointed out in the claims, the following description and the annexed drawings setting forth in detail a certain preferred embodiment of the invention, this being indicative, however, of but one of the various ways in which the principles of the invention may be employed.

BRIEF DESCRIPTION OF THE DRAWINGS

In the annexed drawings:

FIG. 1 is a fragmentary longitudinal section through a prior limited angle torque motor design;

FIG. 2 is a transverse section through the motor of FIG. 1, taken substantially along the plane of the line 2—2 thereof;

FIG. 3 is a graphic illustration showing the amount of applied current required to achieve a useful output torque for various motor shaft angles of the prior motor design of FIGS. 1 and 2;

FIG. 6 is a fragmentary longitudinal section through a preferred form of limited angle torque motor constructed in accordance with this invention;

FIG. 7 is a transverse section through the improved motor design of FIG. 6, taken substantially along the plane of the line 7—7 thereof;

FIG. 8 is a schematic illustration similar to FIG. 3 but showing the increased useful output torque performance of the improved motor design of FIGS. 6 and 7 at ±40°;

DETAILED DESCRIPTION OF THE PREFERRED EMBODIMENT

Figures 4, 5:
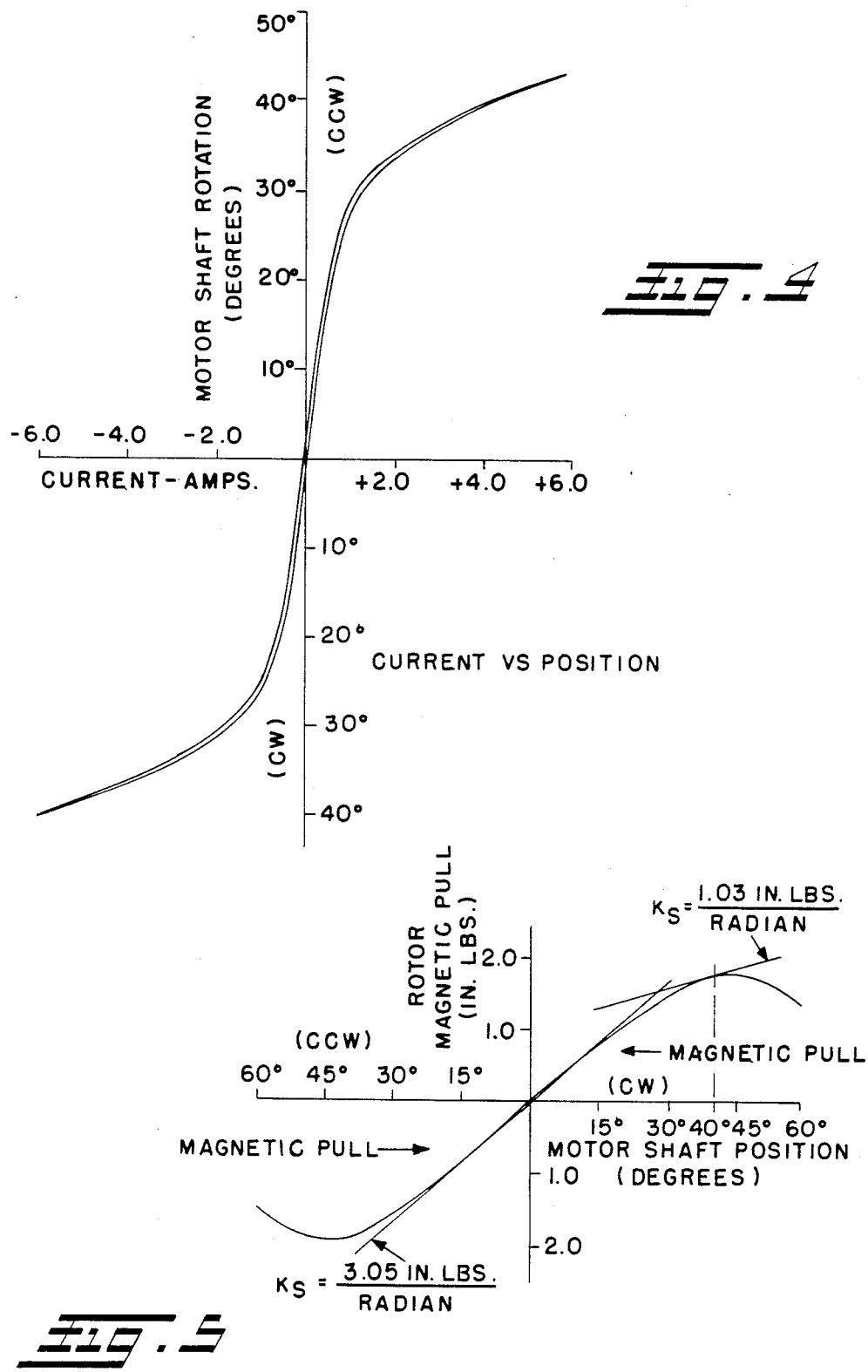
FIG. 4 is a graphic illustration showing the amount of current required to rotate the prior motor design of FIGS. 1 and 2 approximately ±40° from null.
FIG. 5 is a graphic illustration showing the reluctance torque spring rate of the prior motor design of FIGS. 1 and 2 through null.

Referring now in detail to the drawings, and initially to FIGS. 1 and 2, there is shown a prior limited angle torque motor design 10 generally of the type disclosed in U.S. Pat. No. 4,510,403 assigned to the same assignee as the present application. Such motor is a non-commutated 2-pole stationary coil rotary magnet motor and desirably consists of two main assemblies, a rotor assembly 12 and a stator assembly 14. The rotor assembly 12 includes a rotor shaft 16 having one or more permanent magnets 18 intermediate the ends thereof which are magnetized in the diametrical direction, that is, the north and south poles N and S of the magnets are diametrically oriented as shown in FIG. 2. The ends of the rotor shaft may be suitably journaled for rotation within a motor housing 20 as schematically shown in FIG. 1.

Surrounding the rotor assembly 12 is a stationary casing or sleeve 22 which is slightly radially spaced therefrom to provide a flux path clearance 24 therebetween. The rotor casing is in turn surrounded by the stator assembly 14 which desirably includes one or more pairs of circumferentially sapced stator pole pieces 26, 28. Each pole piece 26, 28 is desirably of the same general configuration including a generally axially extending pole blade 30 about which one or more stator coils 32 circumferentially extend with the axes of the coils being generally parallel to the rotor axis. A flange or end portion 34 extends radially outwardly from one end only of each stator pole blade 30, with such stator pole pieces being arranged such that the stator pole flanges 34 are at opposite ends thereof, whereby when the stator coils are excited by a direct or pulse width modulated current applied thereto, the stator magnetic pole flanges will cause a cross or transverse flux through the stator and rotor assemblies which produces a turning torque in the motor. A magnetic housing 36 made of a suitable magnetic material such as soft iron surrounds the stator coils 32. Also, the stator magnetic pole flanges 34 desirably extend radially outwardly into contact with the inner surface of the outer magnetic housing 36, thus providing a magnetic return path for the magnetic field when the stator coils are excited.

Typically, the radial side edges 37, 38 of the stator pole pieces 26, 28 are parallel to each other and in line with the motor centerline as shown in FIGS. 1 and 2. Also, such side edges may extend at an angle, for example, a 12° angle as measured from a transverse plane passing centrally between the stator pole pieces as further shown in FIG. 2 to provide an average gap width "X" between such opposed side edges along the entire length thereof. Moreover, the magnetic return path is typically partially interrupted as by providing one or more air gaps therein. In the prior motor design shown in FIGS. 1 and 2, the outer magnetic housing 36 may have an air gap 39 of 0.005 inch on one side and an air gap 40 of 0.125 inch on the other side.

As long as there are one or more air gaps 39, 40 in the outer magnetic housing 36, the magnetic flux produced by the permanent rotor magnets 18 will generally follow the paths schematically illustrated in FIG. 2 running from the magnet north pole N in opposite directions through the stator magnetic poles 26, 28 and back to the magnet south pole S. This magnetic flux develops a magnetic reluctance torque that tends to center the rotor north and south poles about an axis extending substantially centrally between the opposed side edges of the stator magnetic pole pieces. If the rotor shaft is rotated by an external force, the magnetic reluctance torque develops a restoring torque which varies in magnitude with rotation and acts in opposition to the applied external force tending to return the rotor north and south poles to the original centered position shown in FIG. 2. Such magnetic reluctance torque produced by the magnet fluxes may be used to provide a centering function for the rotor shaft tending to return the rotor shaft to the FIG. 2 position in which the motor angle equals 0° whenever the current to the stator coils is interrupted.

The intensity of the magnetic restoring torque may be varied to obtain a particular magnetic centering spring rate at a particular torque or power level by varying the length of the air gaps 39, 40 in the outer magnetic housing. As the length of the air gaps increases, the magnetic restoring torque increases.

In addition to the magnetic reluctance torque developed by the rotor magnets, an electro-magnetic or magnetic fields torque is developed when the electro-magnetic stator coils 32 are excited. The magnetic fields torque is proportional to the amount of direct or pulse width modulated current passing through the stator coils. Also, when a positive current is applied, a positive torque tending to rotate the rotor shaft 16 in a clockwise direction as viewed in FIG. 2 is produced, whereas when a negative current is applied, a negative torque tending to rotate the rotor shaft in a counter-clockwise direction is produced over the same excursion of the rotor shaft.

This interaction of magnetic fields (electro-magnetic) torque developed by applying current to the stator coils combines with the magnetic reluctance torque produced by the rotor magnets to provide a net torque output for the motor at various angular shaft positions which will vary depending on the magnetic reluctance torque profile for a given motor design. As FIG. 3 clearly illustrates, with the prior motor design 10 shown in FIGS. 1 and 2, when no current is being applied to the stator coils 32, if the rotor shaft 16 is rotated in either direction to different angular positions, the rotor magnets 18 will produce a magnetic reluctance torque which increases with increased motor angle tending to return the rotor to the null or 0° position shown in FIG. 2. For example, at the 0° rotor position, the centering torque acting on the rotor is 0; at the 10° position, the centering torque acting on the rotor tending to return it to the 0° position is approximately 0.4 in lb.; at the 20° position the centering torque is approximately 1 in. lb; at the 30° position the centering torque is approximately 1.6 in. lb.; and at the 40° position the centering torque is approximately 2 in. lb.

Before any useful work output can be obtained with such a motor design, sufficient direct or pulse width modulated current must be applied to the stator coils 32 to produce an electro-magnetic torque that is greater than that consumed in overcoming the magnetic reluctance centering torque. As FIG. 3 further graphically illustrates, at the 10° motor angle position, useful work output is obtained when a negative current of 0.3 or more amps is applied. However, when the motor angle is increased to 40°, a negative current of more than 5 amps is required to produce any useful torque output.

Also, from FIG. 4 it can be seen that when a current of more than 5 amps is applied to rotate the prior motor design of FIGS. 1 and 2 out to a useful working angle of ±40°, a rather abrupt and undesirable knee occurs in the current versus motor shaft rotation at about 1 amp and 25° angular displacement. This means that the motor displacement for such prior motor design is only linear up to about 25°. Above 25°, the motor displacement is no longer linear, which makes it more difficult to obtain uniform control of valve flow above 25° utilizing such prior motor design. Also, a disproportionately greater amount of current is requird to achieve angular displacements above about 25°, which is undesirable.

The reluctance torque spring rate characteristics for this prior motor design is shown in FIG. 5, which measures approximately 3.05 in. lb./radian through null.

In accordance with the present invention, the useful working angle for this type of motor design is increased without increase in current and without reducing the inherent spring rate through null, which is required for system performance as an electro-hydraulic servo valve. Also, a more linear rotation angle versus current is achieved throughout the increased useful working angle of the motor for more uniform control of valve flow when used to operate a hydraulic flow control valve. These improved results are obtained in accordance with the present invention by the improved motor design 50 shown in FIGS. 6 and 7, which is similar in many respects to the prior motor design 10 shown in FIGS. 1 and 2, and accordingly, the same reference numerals followed by prime symbols are used to designate like parts. The opposed side edges 52, 54 of the stator pole pieces 56, 58 of the improved motor designed 50 may still have the same average gap width "X" as in the prior design. However, the improved motor design 50 differs from the prior motor design 10 in that the respective side edges 52, 54 of each of the stator pole pieces 56, 58, rather than being parallel to the motor centerline over their entire length as shown in FIGS. 1 and 2, taper outwardly away from each other from one end to the other at an angle to the motor centerline for increasing the circumferential width of the stator pole blades 60 in the direction of the respective stator pole flanges 62. This increases the amount of magnetic material in the region of the respective pole flanges 62 where the flux density is the highest, thereby reducing the tendency of the magnetic stator structure to magnetically saturate in a localized region. In the preferred embodiment disclosed herein, the stator pole piece side edges 52, 54 are desirably tapered at an angle of approximately 6° as measured from the longitudinal centerline of the motor from one end of the stator pole pieces to the other over their entire length.

Such tapering of the stator pole piece side edges increases the component of the magnetic reluctance torque due to the permanent magnets 18' and stator pole flanges 62. This would also normally add to the magnetic reluctance torque component due to the permanent magnets 18' and the two halves of the outer magnetic housing 64. However, since the required reluctance torque is realized by tapering the pole piece side edges as aforesaid, the air gaps 66, 68 in the housing may be reduced, for example, to 0.001 inch or less as shown in FIGS. 6 and 7, thereby effectively eliminating such air gaps. Any such reduction in the housing air gaps increases the interaction of magnetic fields torque component, particularly for larger angular displacements of the rotor.

Figures 9, 10:
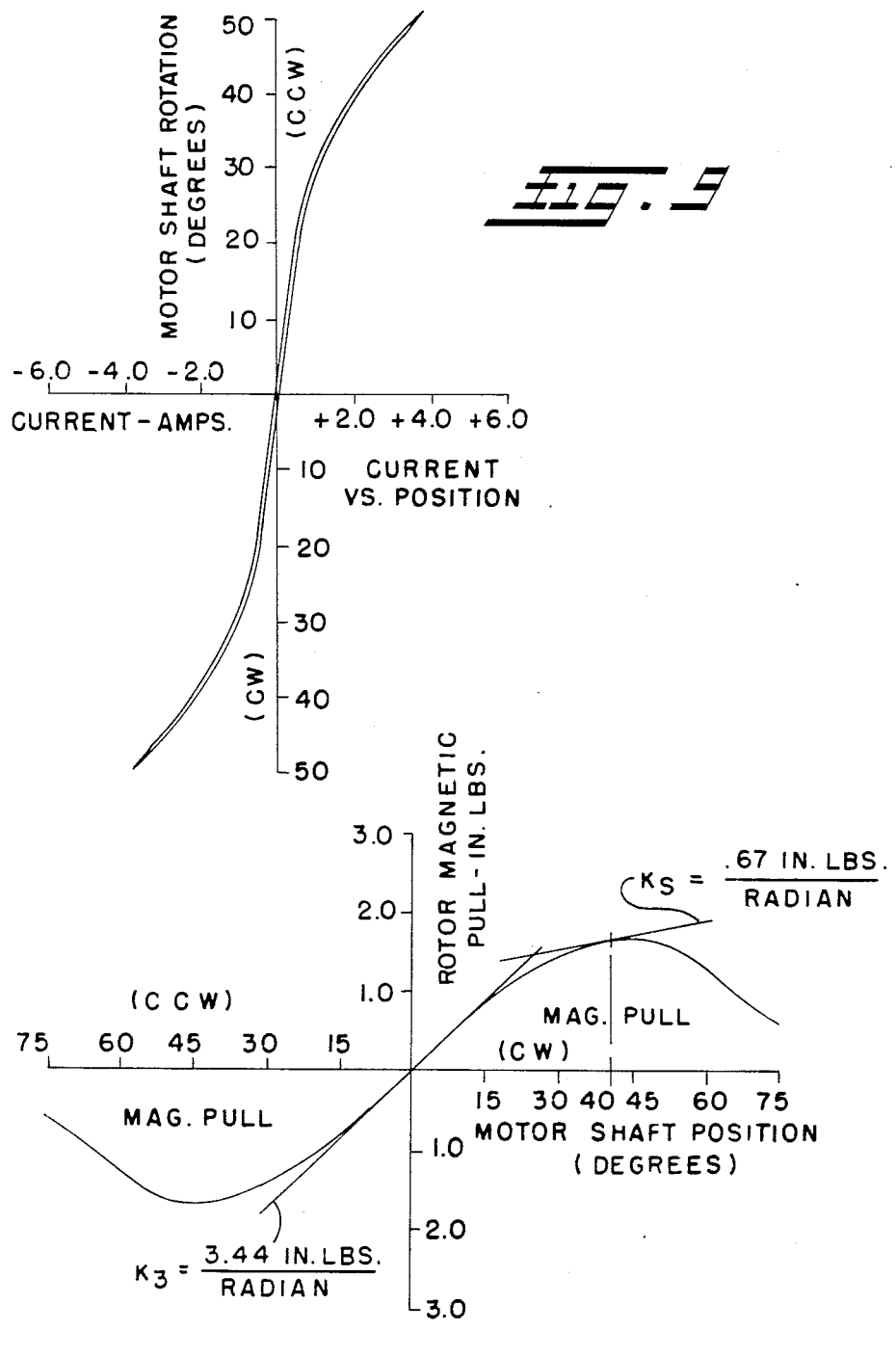
FIG. 9 is a schematic illustration similar to FIG. 4 but showing the more linear rotation angle versus current produced by the improved motor design of FIGS. 6 and 7 which allows for more uniform valve control.
FIG. 10 is a schematic illustration similar to FIG. 5 but showing the reluctance torque spring rate of the improved motor design of FIGS. 6 and 7 through null.

As the locked rotor torque versus current plots of FIG. 8 clearly show, the useful output torque for such improved motor design 50 begins to occur at about 2.4 amps as compared with about 6 amps for the prior motor design 10. In terms of power, this amounts to a reduction of approximately 84%. Also, as shown in FIG. 9, the resultant rotation versus current curve for the improved motor design 50 is more linear without the abrupt knee of the prior motor design 10 shown in FIG. 4, which has the advantage of providing a more linear rotation angle versus current for more uniform control of valve flow when installed for example on a hydraulic flow control valve. Furthermore, the useful working angle of the motor 50 is increased without reducing the inherent spring rate through null which is required for system performance as an electrohydraulic servo valve. As shown in FIG. 10, the spring rate characteristic of the improved motor design of the present invention measures 3.44 in. lbs./radian through null as compared to 3.05 in. lbs./radian through null for the prior motor design.

Figure 11:
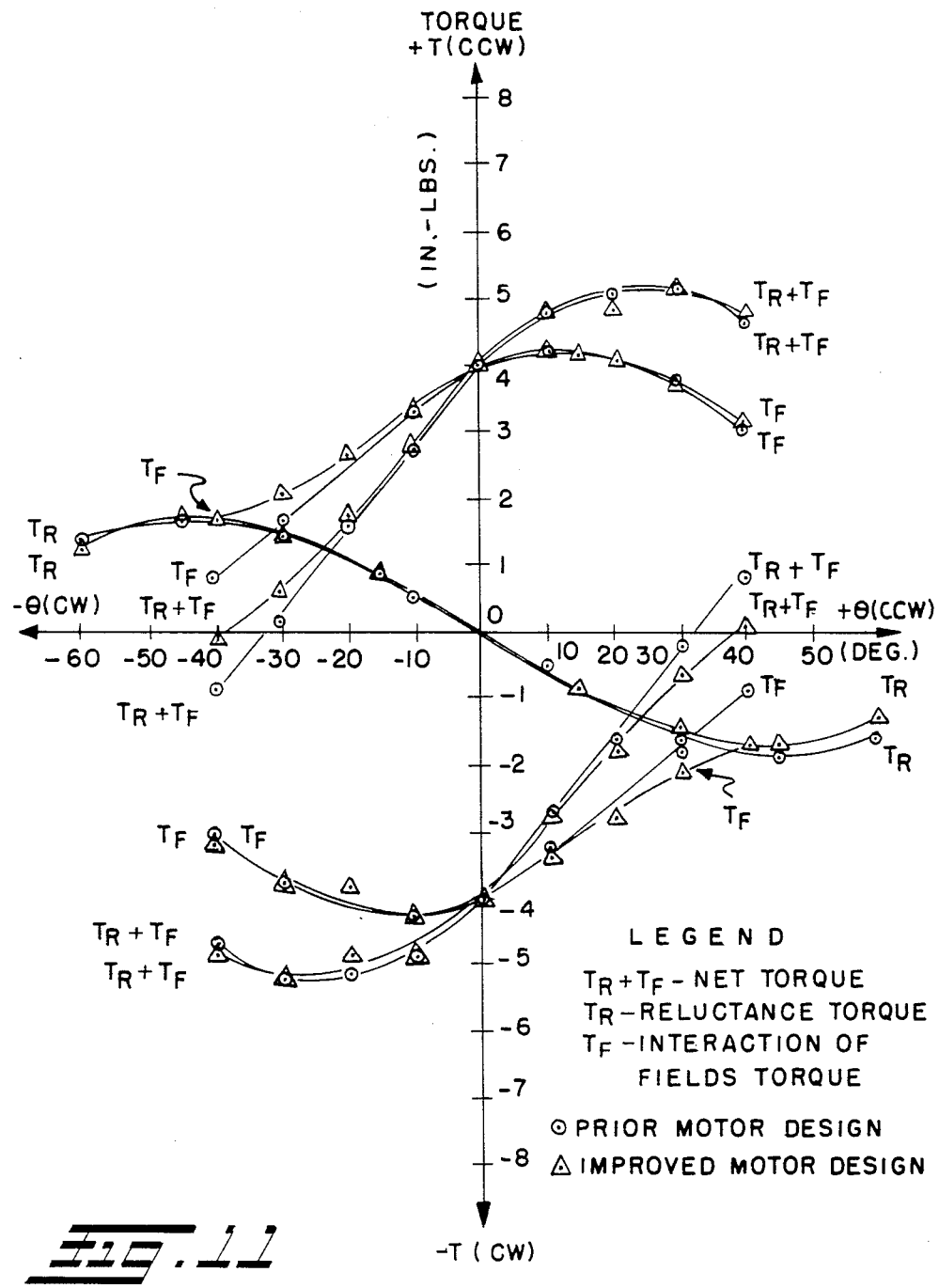
FIG. 11 is a schematic illustration comparing the net torque output of the improved motor design of FIGS. 6 and 7 to that of the prior motor design shown in FIGS. 1 and 2 for different angular displacements when a constant current of the same magnitude is applied to the respective motor designs.

FIG. 8 also shows that with the improved motor design 50 including an angled pole gap "X" and reduced housing gap 66, 68, the reluctance torque (i.e. spring rate curve profile) of the motor is about the same as in the prior motor design. For example, at 0 current and 40° rotation angle, the spring centering torque of the improved motor design is 1.8 inch pounds as compared to 2 inch pounds for the prior motor design. However, FIG. 11 shows that the interaction of magnetic fields torque component, $T_F$, of the improved motor design 50 is substantially increased particularly at the larger angular displacements of the rotor, whereby a useful torque output at the larger angular displacements can be achieved at a much lower current. Of course, it will be apparent that the interaction of magnetic fields torque $T_F$ of the motor must be greater than the reluctance torque $T_R$ at any given motor angle in order to obtain a net torque output $T_R + T_F$ from the motor. As illustrated in FIG. 11, this is the case with respect to the improved motor design 50 all the way out to ±40° of motor rotation. However, as FIG. 11 also clearly shows, the prior motor design 10 has a net torque output only out to approximately ±32° of motor rotation. Moreover, FIG. 11 also clearly illustrates that the net torque output of the new motor design 50 was increased by about 0.8 in. lb. over the prior motor design 10 at ±40° of motor rotation. This improved performance is due to the tapered pole piece side edges which allow a significant reduction in the outer magnetic housing air gaps.

Although the invention has been shown and described with respect to a certain preferred embodiment, it is obvious that equivalent alterations and modifications will occur to others skilled in the art upon the reading and understanding of the specification. The present invention includes all such equivalent alterations and modifications, and is limited only by the scope of the claims.

What is claimed is:

1. A limited angle torque motor comprising a rotor assembly including a rotor shaft and a diametrically oriented permanent rotor magnet mounted on said rotor shaft, and a stator assembly surrounding said rotor assembly, said rotor shaft being mounted for rotation relative to said stator assembly, said stator assembly including a pair of circumferentially spaced stator pole pieces, said stator pole pieces including stator pole flanges extending radially outwardly therefrom, said stator pole pieces having a circumferential width which varies over the axial length of said stator pole pieces and is greatest in the region of said stator pole flanges.

2. The motor of claim 1 wherein said stator pole pieces have opposed side edges which taper in a direction to provide the greatest circumferential width for said stator pole pieces in the region of said stator pole flanges.

3. The motor of claim 2 wherein the respective stator pole flanges are at opposite ends of said pair of stator pole pieces, said stator pole pieces having a greater circumferential width at the end from which the respective stator pole flanges extend than at the opposite end thereof.

4. The motor of claim 3 wherein said opposed side edges of said stator pole pieces are parallel to each other over their entire length.

5. The motor of claim 3 wherein said stator pole piece side edges have the same average gap width therebetween over their entire length.

6. The motor of claim 3 wherein said stator pole piece side edges are tapered at an angle of approximately 6° relative to the longitudinal centerline of said motor over their entire length from one end of said stator pole pieces to the other.

7. The motor of claim 1 further comprising an outer magnetic housing surrounding said stator assembly, said magnetic housing having effectively no air gap therein.

8. The motor of claim 7 wherein said magnetic housing has an air gap of 0.001 inch or less.

9. A limited angle torque motor comprising a rotor assembly and stator assembly, said rotor assembly including a rotor shaft mounted for rotation relative to said stator assembly and a diametrically oriented permanent rotor magnet mounted for rotation with said rotor shaft, and said stator assembly including a pair of circumferentially spaced stator magnetic pole pieces each having a stator pole flange extending radially outwardly therefrom, stator coil means surrounding said stator pole pieces, and a magnetic housing surrounding said stator coil means, said stator pole pieces having opposed side edges tapered away from each other in the direction of the respective stator pole flanges to provide the greatest circumferential width for said stator pole pieces in the region of the respective stator pole flanges where the flux density is the highest.

10. The motor of claim 9 wherein said stator pole flanges are at opposite ends of the respective stator pole pieces, and the side edges of each of said stator pole pieces taper away from each other from the end opposite said stator pole flange toward said stator pole flange.

11. The motor of claim 9 wherein said opposed stator pole piece side edges are substantially parallel to each other over their entire length.

12. The motor of claim 9 wherein the opposed stator pole piece side edges have substantially the same average gap width therebetween over their entire length.

13. The motor of claim 9 wherein said magnetic housing has an air gap of 0.001 inch or less.

14. The motor of claim 13 wherein said magnetic housing effectively has no air gap therein.

15. The motor of claim 9 wherein each of said stator pole pieces includes an axially extending stator pole blade from which the respective stator pole flanges extend radially outwardly from one end thereof, said stator pole blades having a circumferential width which varies from a maximum at the end from which the respective stator pole flanges extend to a minimum at the end opposite the respective stator pole flanges.

16. The motor of claim 15 wherein said stator pole blades include said stator pole piece side edges which are uniformly tapered at an angle to the motor centerline over their entire length from one end to the other.

17. The motor of claim 16 wherein said stator pole blades have a uniform inner diameter over their entire length.

* * * * *